United States Patent
Maier et al.

[11] Patent Number: 6,161,305
[45] Date of Patent: Dec. 19, 2000

[54] PROCESS AND PLANT FOR MECHANICAL AND THERMAL DEWATERING OF SLUDGES

[75] Inventors: Christian Maier, Fürstenfeld; Erwin Brunnmair, Graz, both of Austria

[73] Assignee: Andritz-Patentverwaltungs-Gesellschaft m.b.H., Graz, Austria

[21] Appl. No.: 09/256,776

[22] Filed: Feb. 24, 1999

[30] Foreign Application Priority Data

Mar. 26, 1998 [AT] Austria ........................................ 342/98

[51] Int. Cl.[7] ........................................... F26B 5/08
[52] U.S. Cl. ................... 34/315; 34/323; 34/423; 34/221; 34/222; 34/224
[58] Field of Search .......................... 34/312, 315, 316, 34/318, 323, 327, 360, 359, 363, 423, 424, 425, 147, 179, 182, 221, 222, 224, 226; 110/243, 244, 245

[56] References Cited

U.S. PATENT DOCUMENTS

| | | | |
|---|---|---|---|
| 4,330,411 | 5/1982 | Florin et al. | 210/769 |
| 4,970,803 | 11/1990 | Keller | 34/10 |
| 5,215,670 | 6/1993 | Girovich | 210/770 |
| 5,309,849 | 5/1994 | Krebs | 110/224 |
| 5,426,866 | 6/1995 | Rumocki | 34/321 |
| 5,611,935 | 3/1997 | Thiemann et al. | 210/742 |
| 5,775,004 | 7/1998 | Steier et al. | 34/424 |
| 5,960,559 | 10/1999 | Brunnmair et al. | 34/514 |

*Primary Examiner*—Denise L. Ferensic
*Assistant Examiner*—Andrea M. Joyce
*Attorney, Agent, or Firm*—Roylance, Abrams, Berdo & Goodman, L.L.P.

[57] ABSTRACT

A process and apparatus for mechanical and thermal dewatering of solid-liquid mixture, particularly industrial and sewage sludges, feeds the sludge to a dewatering device to produce a dewatered material which is then dried in a thermal drier. The dewatered sludge is reduced to a granulate-like structure without any intermediate stage and is then dried immediately afterwards. An apparatus for implementing the process includes a mechanical dewatering device being directly connected to a feed unit to produce a granulate-like structure and which is permanently connected to the thermal drier.

27 Claims, 5 Drawing Sheets

PROCESS AND PLANT FOR MECHANICAL AND THERMAL DEWATERING OF SLUDGES

FIELD OF THE INVENTION

The present invention is directed to a process and apparatus for drying sludge. More particularly, the invention is directed to a process and apparatus for drying sludge by dewatering the sludge and then passing sludge particles through a heated drier.

BACKGROUND OF THE INVENTION

Sludge from municipal waste water treatment plants or paper mills is typically passed through a mechanical dewatering operation to remove a portion of the water. The mechanically dewatered sludge is then fed to a sludge drying plant which utilizes heated air in a suitable drying drum. The dried sludge is then pelletized and disposed of as permitted by the local regulations.

Municipal waste water sludges generally contain a high portion of organic components which must be decomposed before disposal. Typically, the sludge is passed through a heated drier to inactivate or decompose the organic components. Several countries have enacted regulations which are expected to be effective in 2005 to restrict the organic content of the sludge before it can be transferred to a landfill. These regulations generally require an organic content of less than 5% before disposal.

At this time, waste water sludges, and particularly sewage sludges, are passed through a series of heated drying stages after the mechanical dewatering step to ensure decomposition of the organic materials and complete drying of the sludge. Sewage sludges can be particularly difficult to handle since the sludge goes through a sticky phase during drying. Typically, the drying process for sewage sludge recycles a portion of previously dried material and mixes the dried material with fresh wet sludge to increase the solid content of the material fed to the heated drier. Examples of this type of process are disclosed in U.S. Pat. No. 5,318,184 to Krebs, U.S. Pat. No. 5,309,849 to Krebs, U.S. Pat. No. 5,611,935 to Theimann et al. and U.S. Pat. No. 5,337,496 to Glorioso, which are hereby incorporated by reference in their entirety.

Backfeeding of recycled dried material is costly and reduces the output of the drying apparatus. Thus, efforts have been made to reduce the amount of backfeed material. For example, German Patent DE 4332799 discloses a drying chamber surrounding a centrifuge. This design however is difficult to maintain and very expensive to manufacture. Furthermore, this design of the centrifuge is difficult to operate in a manner to produce a uniform output of dried material and a uniform granular size. As a result, subsequent drying steps produce particles of uneven moisture content and non-uniform particle size.

Accordingly, a continuing need exists in the industry for a drying process and apparatus for drying municipal waste water sludges.

SUMMARY OF THE INVENTION

The present invention is directed to a process and apparatus for drying industrial and sewage sludges. Accordingly, a primary object of the invention is to provide a process and apparatus for efficiently drying sludge.

A further object of the invention is to provide a process and apparatus for drying sludge where the sludge is mechanically dewatered before passing through a heated drier.

Another object of the invention is to provide a process and apparatus for drying sludge in a single operation without recycling previously dried sludge particles to the dewatering device or the drier.

Still another object of the invention is to provide an efficient and economical process and apparatus for drying sludge.

A further object of the invention is to provide a process and apparatus for drying sludge where the sludge is dewatered and granulated and immediately thereafter the dewatered granules are passed through a heated drier.

Another object of the invention is to provide a process and apparatus which is able to dry sewage sludge and produce substantially uniform granules of dried sludge.

A further object of the invention is to provide a process and apparatus for drying sludge where the sludge is mechanically dewatered in a centrifuge, belt press, plate and frame pressure filter or other device and passed through a granulator directly into a heated drier to form substantially uniform dried granules of sludge.

These and other objects of the invention are basically attained by providing a process for drying sludge comprising the steps of: feeding wet sludge to a mechanical dewatering device and dewatering the sludge to form a dewatered sludge, immediately thereafter, feeding the dewatered sludge to a feed device for granulating and producing a granulated dewatered sludge, and immediately thereafter, heating the granulated dewatered sludge in a drier to produce dried sludge granules.

The objects of the invention are further attained by providing a process for drying sludge comprising the steps of: producing a mechanically dewatered sludge, feeding the mechanically dewater sludge through a granulator for feeding the mechanically dewatered sludge granules directly into a hot drying gas stream and entraining the granules in the gas stream and passing the granules and gas stream through a drier, and drying the granules to produce dried sludge granules.

The objects of the invention are also attained by providing an apparatus for drying a solid-liquid mixture comprising: a mechanical dewatering device for receiving a solid-liquid mixture and producing a dewatered mixture; a feed device operatively connected to the mechanical dewatering device for receiving the dewatered mixture and producing a granulated dewatered mixture; and a thermal drier having an inlet for receiving the granulated dewatered mixture and producing a substantially dry granular material, the feed device being coupled directly to the thermal drier for feeding the granulated dewatered mixture directly to the thermal drier.

The objects, advantages and salient features of the invention will become apparent from the following detailed description, which in conjunction with the annexed drawings, disclose preferred embodiments of the invention.

BRIEF DESCRIPTION OF THE DRAWINGS

Referring to the drawings which form a part of this disclosure.

DETAILED DESCRIPTION OF THE INVENTION

The present invention is directed to a process and apparatus for producing dried sludge or other materials. The invention is particularly directed to drying industrial and municipal sewage sludge, although other materials can be dried in the apparatus. As used herein, the term sludge refers to a solid/liquid mixture or slurry of various solid materials and liquids.

Figure 1:
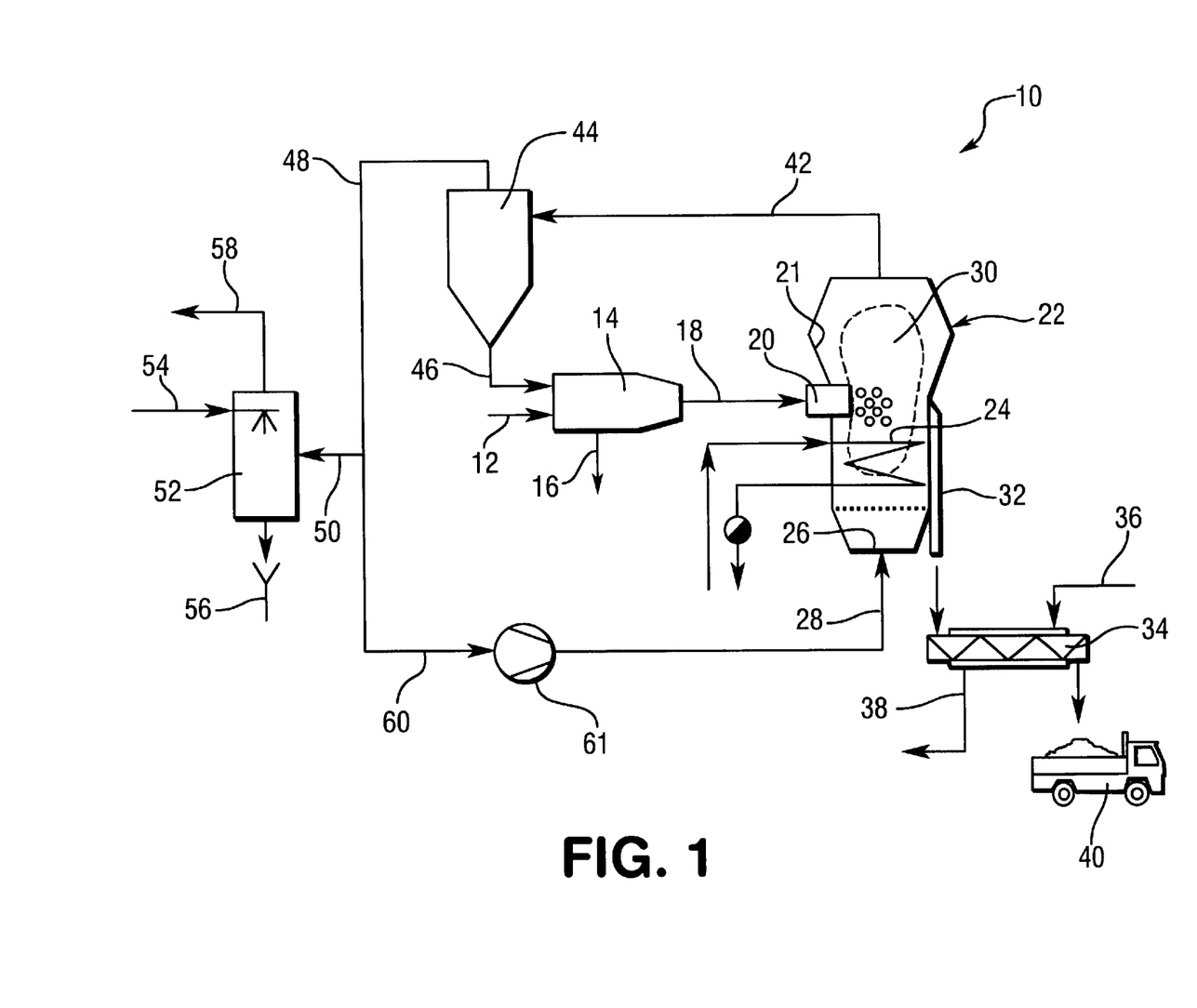
FIG. 1 is a schematic diagram of the process and apparatus for drying sludge in a first embodiment of the invention.

Referring to FIG. 1, the apparatus 10 for carrying out the process of producing the dried sludge particles is illustrated. Fresh or low consistency sludge is fed through a pipe 12 into a centrifuge 14 for mechanically dewatering the sludge. The sludge entering the centrifuge 14 is generally fresh sludge containing about 2% to 5% by weight solids and the remainder liquid. The centrifuge 14 can be, for example, a conventional centrifuge used for dewatering sludges and slurries as known in the art. The centrifuge 14 separates a portion of the liquid from the sludge and discharges the liquid portion through a line 16 which can be discharged or recycled as needed. A mechanically dewatered sludge is discharged through a pipe 18 and is fed directly to a feed device 20. The mechanically dewatered sludge preferably has a solids content of about 10% to 30% by weight. The solids content of the mechanically dewatered sludge is such that the sludge can be pumped and conveyed using standard equipment. In preferred embodiments of the invention, the dewatered sludge is fed directly from the centrifuge to the feed device 20 without further processing, dewatering or drying.

In the embodiment of FIG. 1, the feed device 20 is mounted in the side wall 21 of a fluidized bed drier 22. The feed device 20 can be permanently mounted on or in the drier 22 and can be positioned partially or entirely in the drier. The fluidized bed drier 22 can be heated by hot exhaust gas from a furnace or burner or by indirect heating using a heat exchange coil 24 mounted in the lower part of the drier. A source of fluidizing drying air or gas is injected through an inlet in the bottom portion 26 of the fluidized bed drier through an inlet pipe 28 and passes through the heat exchange coil 24 where it is heated by steam to form hot drying air. The fluidizing and drying air is injected through the pipe 28 into the fluidized bed drier 22 at a pressure and velocity sufficient to form a fluidized bed 30 of sludge particles for drying the particles. The hot air is introduced into the drier at a temperature between about 250° C. and about 500° C., preferably up to 450° C.

The resulting dried sludge granules exit the fluidized bed drier 22 through a discharge pipe 32 to a screw conveyor 34. The screw conveyor 34 has a cooling liquid inlet 36 and outlet 38 for cooling the dried sludge particles as they pass through the screw conveyor 34. The screw conveyor 34 conveys the dried sludge particles to a suitable discharge site such as, for example, a truck 40 for transporting the dried sludge to a suitable disposal site.

The feed device 20 in the embodiment illustrated in FIG. 1 is mounted in the side wall 21 of the fluidized bed drier 22 to discharge the mechanically dewatered sludge directly into the fluidized bed 30. In further embodiments, the drier can be a moving fluidized bed, drum drier, or belt drier. The feed device 20 discharges the mechanically dried sludge through a suitable discharge nozzle to produce granules of the dewatered sludge and supply the granules directly into the drier 22. Preferably, the feed device 20 introduces the granules directly into the fluidized bed 30 where dust particles in the fluidized bed adhere to the surface of freshly formed wet granules and form a coating to inhibit the agglomeration of the granules in the drier.

In embodiments, the feed device 20 is a granulator capable of forming granules from the mechanically dewatered sludge having a solid content of about 10% to 30% by weight. Generally, the mechanically dewatered sludge has a dry solids content of at least about 18%. The feed device 20 further forms granules having a particle size with an average diameter of about 0.2 mm to about 6.0 mm. Preferably, the dewatered sludge granules have an average particle size of about 1.0 mm to about 4.0 mm. The size of the granules will depend in part on the nature of the sludge being granulated, including the solid contents, density of the solids in the sludge and the temperature of the drying gas. The resulting dried sludge granules have a dry solids content of about 80% to 99% by weight.

The fluidizing and drying gas from the fluidized bed drier 22 absorbs moisture from the sludge granules and is discharged through an exhaust duct 42 which directs the exhaust gas to a solid-gas separator 44. Typically, the exhaust gas stream exiting the drier 22 carries dust and solid particles having a particle size less than about 1 mm. The solid-gas separator 44 is generally a cyclone separator as known in the art. Dust and other small solid particles carried in the exhaust gas having a particle size of 1 mm or less are separated in the separator 44 and discharged through a line 46 which directs the dust and other small solid particles to the centrifuge 14 where the solid particles are consolidated and mixed with the fresh sludge being fed to the centrifuge 14.

In embodiments, the amount of solid particles carried in the exhaust gas stream from the fluidized bed drier 22 can be small such that the mixing of the particles with the fresh sludge has minimal effect on the handling properties of the resulting dewatered sludge. In embodiments, the recycled dust and fine particles can increase the solids content of the sludge to inhibit agglomeration of the granules in the drier and improve efficiency. However, it is not necessary to recycle previously dried granules to the inlet of the mechanical dewatering device or the drier. The temperature of the exhaust air exiting drier 22 ranges between about 75° C. and about 100° C., and preferably about 90° C.

The exhaust gas from the separator 44 is discharged through a pipe 48 where a portion of the exhaust gas is carried through a pipe 50 to a spray condenser 52. In the embodiment illustrated in FIG. 1, the spray condenser 52 includes a spray inlet 54 for introducing water or other condensing liquids into the condenser 52 for removing any entrained particulates and removing soluble gases. The condensate is discharged through a pipe 56 for recycling or further processing. The condensate contains residual heat from the drying process and can be used to preheat the sludge or heating other parts of the plant. The exhaust gas is discharged through a pipe 58 where the gas can be discharged to the atmosphere. The apparatus can be operated with a partial or fully closed gas loop to reduce energy consumption.

The hot, wet exhaust air enters the condenser by line 50 at a temperature between about 75° C. and about 100° C., preferably about 90° C. The washed and cooled exhaust air exits the condenser by line 58 at a temperature between about 45° C. and about 70° C., preferably 55° C.

A portion of the exhaust gas stream from the separator 44 is carried through a pipe 60 to a fan or blower 61 and returned to the inlet pipe 28 for feeding into the fluidized bed drier 22. The exhaust gas stream contains large amounts of residual heat from the drying process so that it is generally desirable to recycle the exhaust gas to the fluidized bed drier 22.

In the process and apparatus of FIG. 1, fresh low consistency sludge having a solids content of about 1–2% by weight is fed to the centrifuge 14 for producing a dewatered sludge having a solids content of about 10% to 30% by weight, and preferably at least about 18%. Preferably, the mechanically pre-dewatered sludge is formed into a granule like structure without any intermediate drying or mixing stages. Unlike conventional sludge drying processes, the dewatered sludge discharged from the mechanical dewatering device is not mixed with previously dried sludge particles or granules such that the solids content is not adjusted prior to feeding to the thermal drying apparatus. The dewatered sludge granules are fed directly into the drying apparatus without further processing. The dewatered sludge is formed into substantially uniform granules to provide uniform dried sewage sludge granules having substantially uniform solids content and particle size.

In the embodiment illustrated in FIG. 1, the feed device 20 is positioned in the side wall 21 of the fluidized bed drier 22 to feed the dewatered sludge granules directly into the existing fluidized bed 30 in the drier. The granules in the fluidized bed contact each other during drying to produce a fine dust fraction in the fluidized bed. In this manner, the granules are fed directly into the drier in an area having a high dust concentration. The dust and other small particles in the fluidized bed adhere to the freshly formed wet dewatered sludge granules to form a coating of dried particles on the granules which prevents the granules from sticking together. In addition, feeding the sludge granules directly into the fluidized bed contributes to the removal of dust particles and other small particles in the exhaust gas stream from being discharged from the drier through the exhaust gas outlet and reduces the amount of dust in the resulting dried sludge granules discharged through the outlet pipe 32. Alternatively, the feed device can be positioned immediately upstream of the drier or inside the drier.

Figure 2:
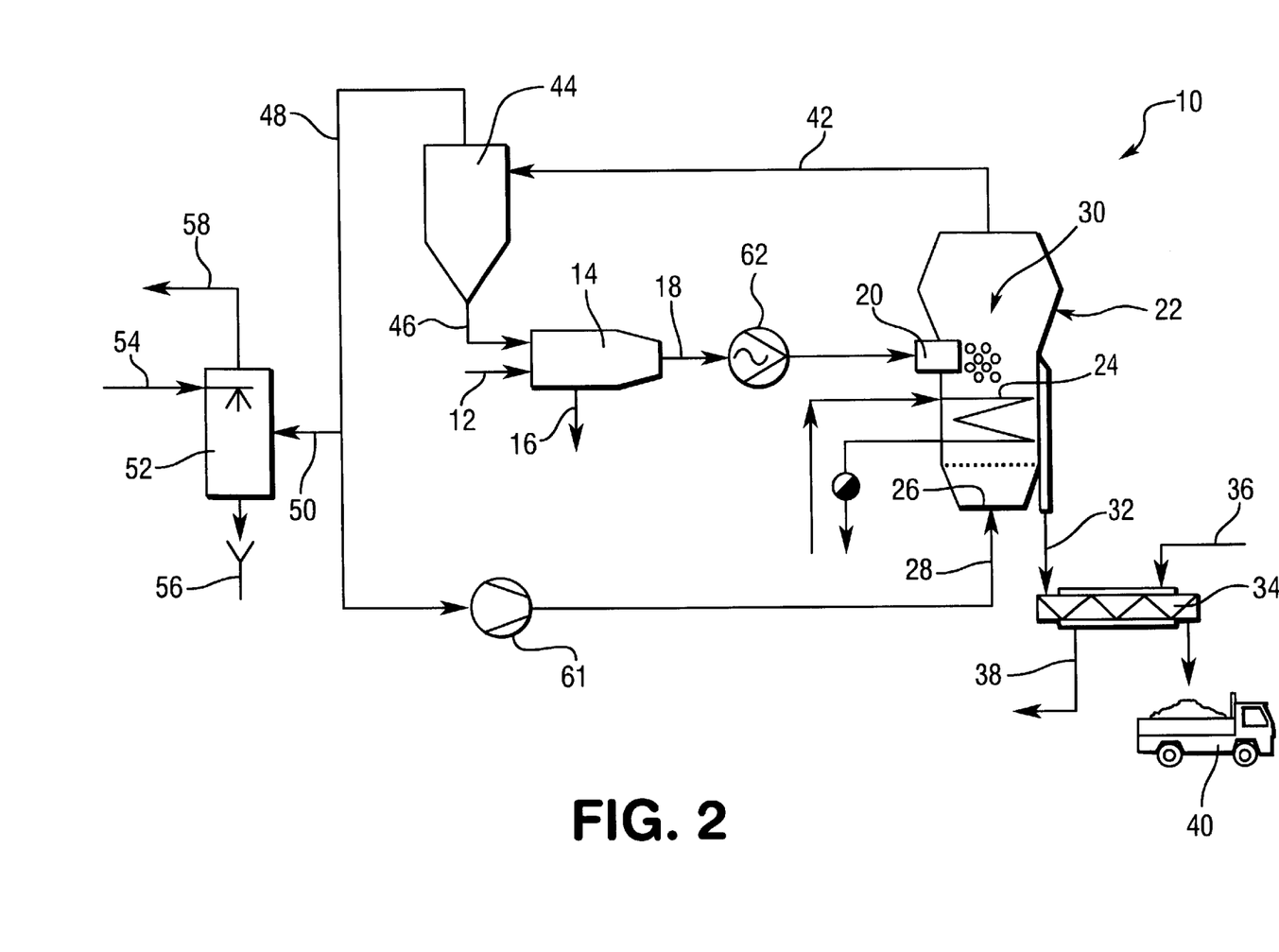
FIG. 2 is a schematic diagram of the process and apparatus for drying sludge in a second embodiment of the invention showing a centrifugal separator and a pump for increasing the feed to the granulator in the drier.

Referring to FIG. 2, a further embodiment of the invention is illustrated which is similar to the embodiment of FIG. 1 except for the addition of a booster pump 62. Similar components of the drying system are identified by the same reference number as in FIG. 1. As shown in FIG. 2, the booster pump 62 is positioned downstream of the centrifuge 14 in the pipe 18 immediately upstream of the feed device 20. The booster pump 62 increases the feed pressure of the mechanically dewatered sludge and feeds the dewatered sludge to the feed device 20 at a substantially constant rate. The booster pump 62 accommodates for fluctuations in the feed rate of the sludge through the centrifuge 14 and the output of the dewatered sludge. In this manner, the feed rate of the dewatered sludge to the feed device 20 is maintained at a controlled and substantially constant level to provide uniform drying and uniform output from the fluidized bed drier 22.

In embodiments of the invention, the centrifuge 14 is able to discharge the dewatered sludge from the outlet at sufficient force to provide adequate pressure of the dewatered sludge to the feed device 20. The centrifuge 14 is operated at sufficient speed so that the kinetic energy of the material at the outlet from the centrifugal zone results in an increased pressure through the pipe 18. Increasing the pressure of the dewatered sludge at the inlet of the feed device 20 provides a substantially constant and uniform feed rate through the feed device and produces uniform size granules in the drier 22.

Figure 3:
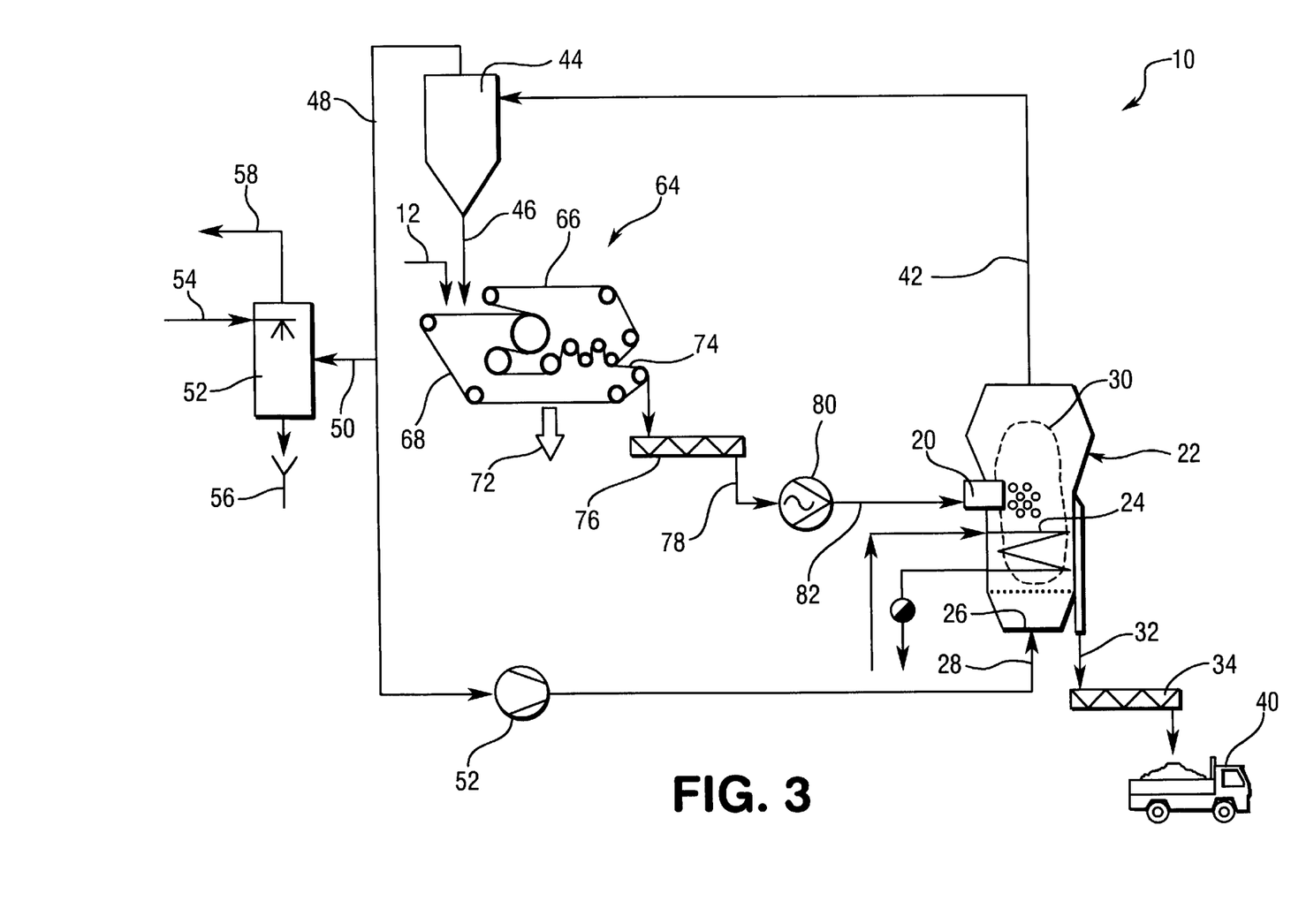
FIG. 3 is a schematic diagram of the process and apparatus for drying sludge in accordance with a further embodiment of the invention showing a belt press for mechanically dewatering the sludge prior to the heated drier.

FIG. 3 illustrates a further embodiment of the invention which is similar to the embodiment of FIG. 1 except for the mechanical dewatering device being a belt press 64. Therefore, identical components are identified by the same reference number as in FIG. 1. In the embodiment of FIG. 3, fresh sludge is fed through line 12 to the belt press 64. The belt press 64 is a conventional belt press having an upper continuous pressure belt 66 and a lower continuous feed belt 68. A portion of the belts 66 and 68 are superimposed on one another and pass over a series of rollers 70 to apply pressure to the sludge between the belts to express liquid from the sludge. The belts 66 and 68 are porous screens and apply pressure to press the water or other liquid from the material being dewatered. The liquid portion is discharged through an outlet 72. The belt press 64 generally produces a dewatered sludge having a solid content of about 10% to 30% by weight.

The mechanically dewatered sludge from the belt press 64 is discharged at an outlet 74 into a screw conveyor 76. The screw conveyor 76 conveys the mechanically dewatered sludge to a discharge pipe 78 which supplies the dewatered sludge to a booster pump 80. The booster pump 80 increases the pressure on the dewatered sludge and feeds the dewatered sludge through a pipe 82 at a substantially constant feed rate to the feed device 20.

The feed device 20 feeds the dewatered sludge through a discharge nozzle to form granules of dewatered sludge directly into the fluidized bed 30 of the drier 22. As in the previous embodiment, the fluidized bed drier 22 is heated by a heat exchange coil 24 and supplied with a fluidizing gas through an inlet 28. The dried sludge granules are discharged from the drier 22 through an outlet pipe 32 and the exhaust gas is discharged through the outlet pipe 42. The outlet gas from the fluidized bed drier is carried to the separator 44 where the dust particles are removed and returned to the receiving end of the feed belt 68 of the belt press 64 through line 46. The exhaust gas from the separator 44 is passed through line 48 where a portion is discharged to the atmosphere after passing through a condenser 52 and the remaining portion carried through line 60 to the inlet 28 of the fluidized bed drier 22.

As in the previous embodiment, the feed device 20 produces granules of the dewatered sludge and feeds the granules directly into the fluidized bed drier in the area of high dust concentration of the fluidized bed. The granules preferably have a average diameter of about 0.2 mm to about 6.0 mm, and more preferably about 1.0 to 4.0 mm.

Figure 4:
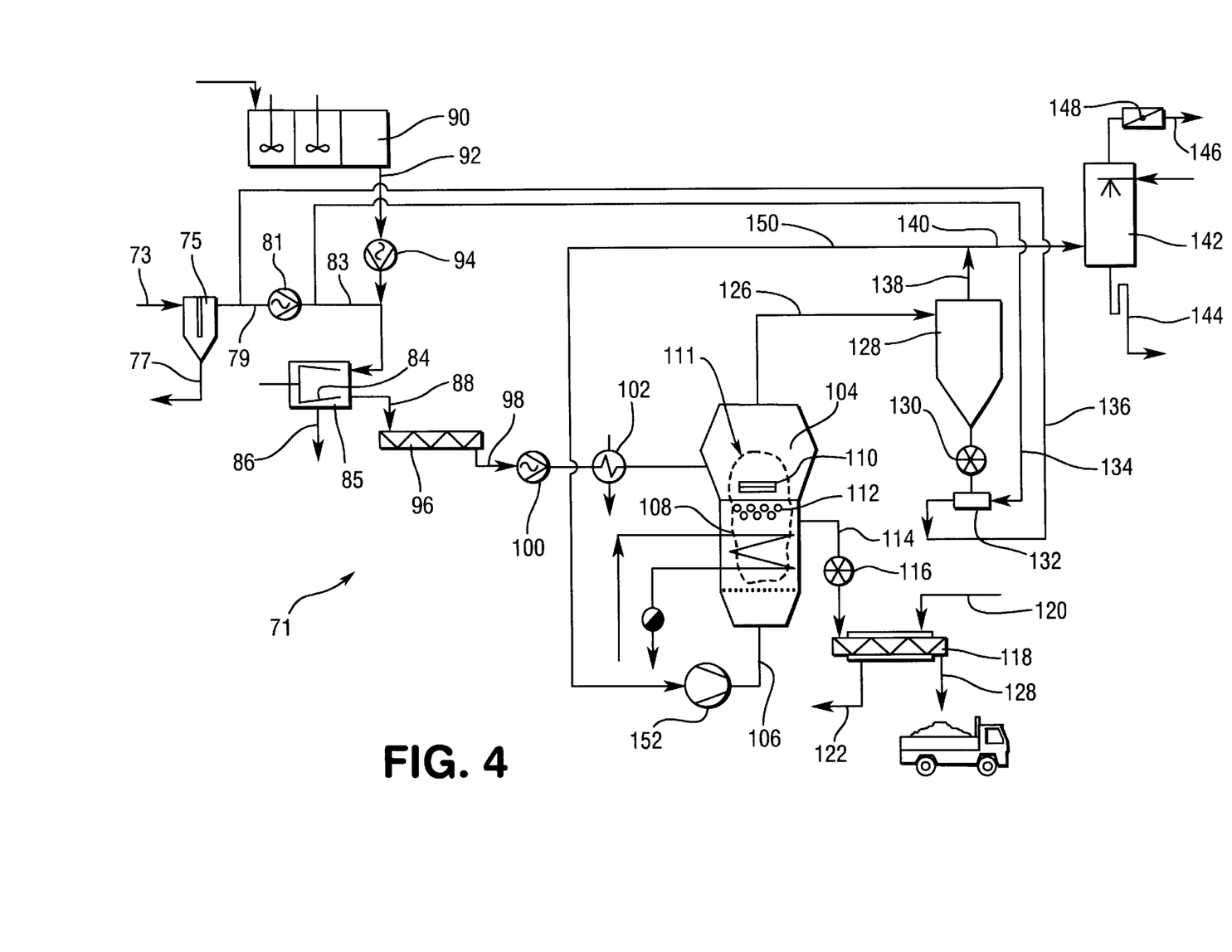
FIG. 4 is a schematic diagram of the process and apparatus in accordance with another embodiment of the invention and showing a plate press for dewatering the sludge prior to feeding to the heated drier.

Referring to FIG. 4, a further embodiment of the sludge drying apparatus is illustrated. In the apparatus 71 of FIG. 4, fresh sludge is fed through an inlet 73 is fed to a first separator 75. The separator 75 is a screening, sifting or sizing device for removing large or hard particles from the fresh sludge as known in the art. In embodiments of the invention, the separator 75 removes particles in the range of about 12 mm or larger, and preferably particles larger than about 6 mm. In further embodiments, the separator 75 can remove particles larger than about 4 mm to reduce damage to the downstream components. The large particles separated from the sludge are discharged through an outlet 77 and the fresh sludge is fed from the separator 75 through a pipe 79 to a pump 81. The sludge is fed from the pump 81 through a pipe 83 to a centrifugal separator 85. Pump 81 can be a helical rotor pump or piston pump. The centrifugal separator 85 is illustrated schematically and generally includes a rotating drum or screen 84, a liquid outlet 86 and a discharge outlet 88 for discharging the dewatered sludge. The dewatered sludge generally has a solids content of about 10% to 30% by weight.

In the embodiment of FIG. 4, a tank 90 supplies a flocculent through a line 92 to a pump 94 which feeds the flocculent to the fresh sludge in line 83. The flocculent is added to the fresh sludge in line 83 in an amount to enhance the dewatering effect of the centrifuge 85. In further embodiments, the centrifuge 85 can be substituted by other mechanical dewatering devices such as belt presses, plate and frame pressure filters and membrane filter presses.

The dewatered sludge discharged from the centrifuge 85 is carried to a screw conveyor 96 which conveys the dewatered sludge through a pipe 98 to a pump 100. The pump 100 pumps the dewatered sludge through an optional heat exchanger 102 for heating the sludge prior to feeding to the drier 104. The heat exchanger can use waste or recycled heat from the system to heat the sludge before feeding to the drier to improve drying efficiency. The drier 104 in the embodiment of FIG. 4 is a fluidized bed drier having a fluidizing air inlet 106 and a heat exchange coil 108 for heating the fluidizing air to a temperature suitable for drying the granules. A granulator 110 is positioned in the area of the fluidized bed 111 in the drier 104 so that granules of the dewatered sludge are fed directly into the fluidized bed 111. In preferred embodiments, the granulator 110 is positioned substantially in the center of the drier 104 and in the center of the area occupied by the fluidized bed. As shown in FIG. 4, the granulator 110 discharges the granules 112 downwardly into the fluidized bed countercurrent to the upward direction of the fluidizing gas.

The heater 102 heats the dewatered sludge prior to feeding to the drier 104. The dewatered sludge can be heated to the operating temperature of the drier 104 to improve the drying capacity of the drier and increase the rate of drying of the sludge in the drier. In embodiments of the invention, the heater 102 can utilize waste heat from the process or from the exhaust gas stream from the drier 104.

The granulator 110 in the embodiment illustrated is positioned inside the drier 104. Alternatively, the granulator can be positioned in the side or top wall of the drier or in the feed pipe upstream of the drier. The granulator produces granules of the dewatered sludge of a suitable size and shape for efficient drying in the drier and to achieve the desired particle size of the dried sludge discharged from the drier.

The dried sludge granules are discharged from the drier 104 through a discharge outlet 114 and through a rotary vane feeder 116 to a screw conveyor 118. The screw conveyor 118 includes a cooling fluid inlet 120 and a fluid outlet 122 for cooling the sludge granules prior to discharging through an outlet 124.

The exhaust gas from the fluidized bed drier 104 is discharged through a line 126 and feeds the exhaust gas to a cyclone separator 128 to remove dust and other small particles from the exhaust gas. The solid particles are discharged from the separator 128 through a rotary vane 130 to a moist or wet process solids backfeeding device 132. The backfeeding device 132 receives a portion of the fresh wet sludge through a line 134 from feed line 76 and discharges a mixture of the fresh sludge and removed solid particles through a line 136. The mixture is carried through line 136 back to the inlet pipe 76 for mixing with fresh wet sludge.

The exhaust gas is discharged from the separator 128 through a pipe 138. A portion of the exhaust gas is discharged through a pipe 140 to a scrubber and spray condensing unit 142 for removing any remaining dust particles and soluble gases. A condensate is removed through a line 144 for discharge and the exhaust gas is discharged to the atmosphere through a line 146. A control device 148 in line 146 is provided to control the amount of exhaust gas discharged to the atmosphere. A second portion of the exhaust gas is carried through a line 150 to a fan or blower 152 which feeds the recycled gas to the inlet 106 of the fluidized bed drier 104.

In further embodiments, the backfeed of the previously dried sludge dust particles can be fed to the mechanically dewatered sludge downstream of the dewatering device or to the granulator 110 for mixing with the fresh dewatered sludge. In preferred embodiments, the dust particles removed from the exhaust gas stream are mixed with fresh wet sludge to form a paste which can be easily fed back into the wet sludge stream. This reduces the difficulties associated with mechanically mixing previously dried dust particles into the wet sludge or into the dewatered sludge upstream of the drier. Furthermore, the mixture of the fresh wet sludge and the dried dust particles can be pumped easily as a slurry. This reduces the difficulties associated with conveying or blowing dry dust particles from the separator 128 to the backfeed of the wet sludge.

Figure 5:
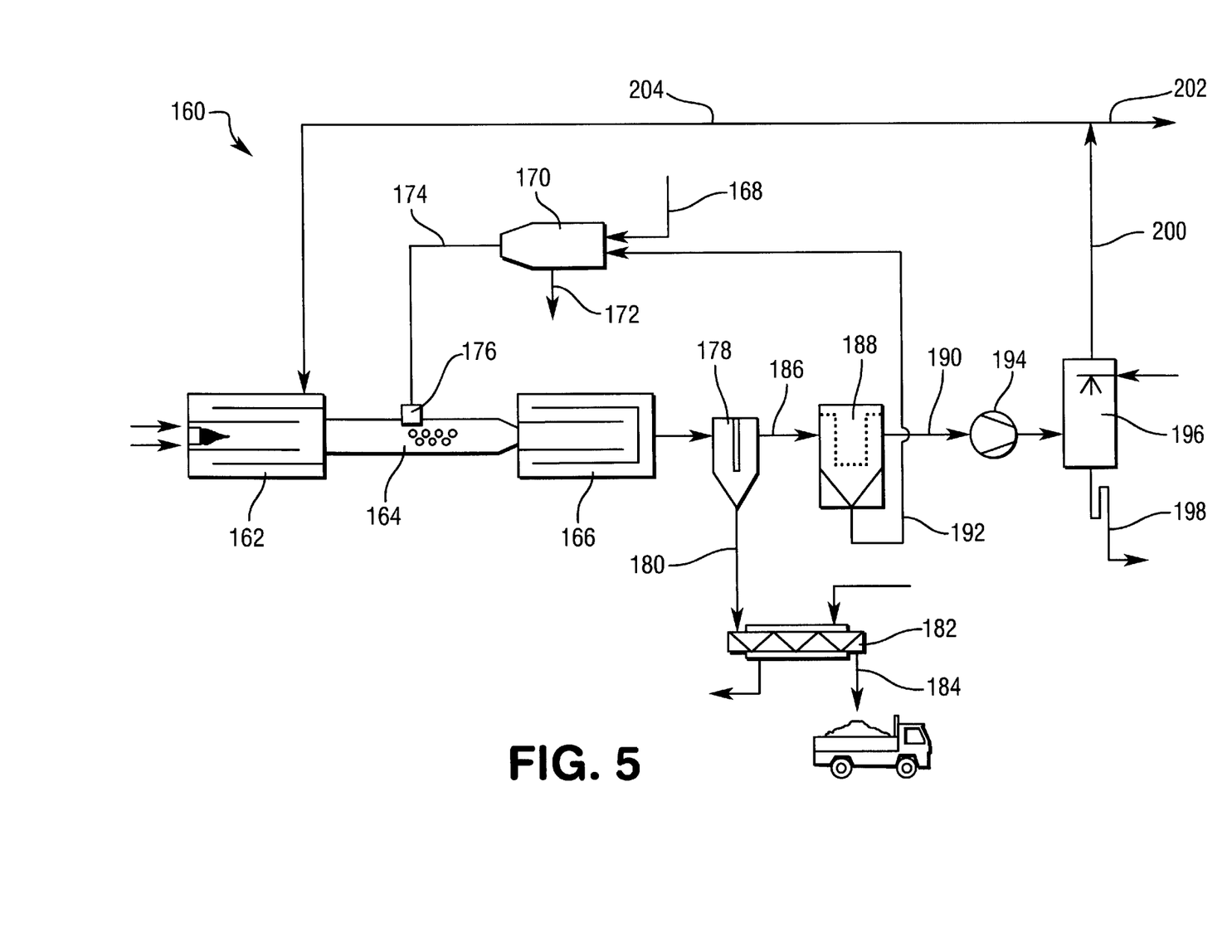
FIG. 5 is a schematic diagram of the invention in a further embodiment showing a centrifuge for mechanically dewatering the sludge prior to feeding to a drum drier.

FIG. 5 illustrates a further embodiment of the invention where the drying apparatus 160 includes a hot air furnace 162 for producing hot exhaust drying gases. The hot exhaust gases are fed through an inlet pipe 164 to a triple pass rotary drum drier 166. Fresh wet sludge is fed through an inlet pipe 168 to a centrifuge 170 to mechanically dewater the sludge. The liquid portion is discharged through an outlet 172 and the dewatered sludge having a solids content of about 10% to 30% by weight is discharged through a pipe 174. The dewatered sludge is fed through pipe 174 to a feed device 176 which in the embodiment shown in FIG. 5 is positioned in the side wall of the pipe 164. Alternatively, the feed device is positioned in the center of the pipe 164 and in the hot gas flow within the pipe 164.

The feed device 176 forms granules of the dewatered sludge and feeds the granules directly into the exhaust gas stream in the pipe 164. The velocity of the exhaust gas stream passing through the pipe 164 is sufficient to carry or entrain the sludge granules through the rotary drum drier 166. The dried sludge granules are then carried to a coarse particle separator device 178 which removes the dried granules from the exhaust gas stream. The sludge granules are discharged through an outlet 180 to a cooling screw conveyor 182 where the cooled sludge granules are discharged through an outlet pipe 184.

The exhaust gas stream carrying dust and other small solid particulates exits the separator 178 through a pipe 186 to a second separator 188. The separator 188 removes dust and fine sludge particles from the exhaust gas stream and discharges the exhaust gas through an outlet pipe 190. The dust and fine sludge particles separated from the exhaust gas stream are discharged through an outlet pipe 192 and carried back to the centrifuge 170 for mixing with the fresh sludge.

The exhaust gas in discharge pipe 190 is conveyed by a blower 194 to a condensing unit 196. A condensate is discharged through an outlet pipe 198 and the exhaust gas is discharged through an outlet pipe 200. A portion of the exhaust gas is discharged to the atmosphere or other cleaning devices through a pipe 202. The remaining portion of the exhaust gas is carried through a pipe 204 back to the furnace 162 where the exhaust gas is incinerated and recycled through the system.

Although the invention has been described with a certain degree of particularity, it is understood that the present disclosure has been made only by way of example and that numerous changes in the details of construction and the combination of arrangement of parts may be made without departing from the spirit and scope of the invention. The invention should not be limited by the foregoing specification, but rather only by the scope of the claims appended hereto.

What is claimed is:

1. A process for drying sludge comprising the steps of
    feeding wet sludge to a mechanical dewatering device and dewatering said sludge to form a dewatered sludge,
    immediately thereafter, feeding said dewatered sludge to a feed device for granulating and producing a granulated dewatered sludge and discharging said granulated dewatered sludge directly into a drier,
    immediately thereafter, heating said granulated dewatered sludge in said drier to produce dried sludge granules, wherein said drier has a drying gas inlet and an exhaust gas outlet,
    discharging exhaust gas from said drier through said gas outlet and recycling said exhaust gas to said inlet of said drier, and
    separating a solid particle fraction having a particle size of less than about 1.0 mm from said exhaust gas and feeding said separated solid particles to said mechanical dewatering device for mixing with said wet sludge.

2. The process of claim 1, wherein said mechanical dewatering device is a centrifugal dewatering device and said process comprising centrifuging said sludge to produce said mechanically dewatered sludge.

3. The process of claim 1, wherein said drier is a fluidized bed drier having a fluidized bed of sludge granules being dried and said feed device is coupled to said drier, said process comprising feeding said granulated dewatered sludge directly into said fluidized bed in an area of high dust concentration.

4. The process of claim 1, comprising increasing the pressure of said dewatered sludge prior to feeding to said drier.

5. The process of claim 1, wherein said dewatering device is a centrifugal dewatering device, wherein said centrifugal dewatering device produces a high pressure zone downstream of said dewatering device and upstream of said feed device for feeding said dewatered sludge into said drier at a substantially uniform rate.

6. The process of claim 1, wherein said mechanical dewatering device is a belt press and said process comprises feeding said sludge to said belt press.

7. The process of claim 1, wherein said granulated dewatered sludge is produced substantially without recycled dry sludge granules.

8. A process for drying sludge comprising the steps of
    producing a mechanically dewatered sludge having a solids content of about 10% to 30% by weight,
    feeding said mechanically dewatered sludge through a granulator coupled to a drier and feeding mechanically dewatered sludge granules directly into a hot drying gas stream and entraining said granules in said gas stream and passing said granules and gas stream through said drier, and
    drying said granules to produce dried sludge granules.

9. The process of claim 8, wherein said mechanically dewatered sludge granules have a granule size of about 0.2 mm to about 6.0 mm.

10. The process of claim 9, wherein said mechanically dewatered sludge has a solids content of about 10% to 30% by weight.

11. The process of claim 8, wherein said dewatered sludge is produced by feeding said wet sludge through a mechanical dewatering device selected from the group consisting of a belt press and a centrifugal dewatering device.

12. The process of claim 8 wherein said dried sludge granules are produced by feeding said dewatered sludge granules through a drier selected from the group consisting of a fluidized bed and a rotary drum drier.

13. The process of claim 8, comprising
    removing an exhaust gas stream from said drier,
    separating a fine particle fraction having a particle size of less than 1 mm from said gas stream, and
    recycling said separated fine particle fraction and mixing with said sludge.

14. The process of claim 13, further comprising recycling said fine particle fraction to said mechanical dewatering device.

15. The process of claim 8, wherein said granulator is positioned within said drier and said process comprises discharging said granules directly into said hot drying gas stream in an area of high dust concentration.

16. An apparatus for drying a solid-liquid mixture comprising:
    a mechanical dewatering device for receiving a solid-liquid mixture and producing a dewatered mixture;
    a feed device operatively connected to said mechanical dewatering device for receiving said dewatered mixture and producing a granulated dewatered mixture; and
    a thermal drier having a source of hot drying gas and a drying gas stream inlet and a particle inlet for receiving said granulated dewatered mixture and producing a substantially dry granular material, said feed device being coupled directly to said inlet of said thermal drier and having an outlet nozzle positioned in said thermal drier for feeding said granulated dewatered mixture directly to an area of high dust concentration in said thermal drier.

17. The apparatus of claim 16, wherein said feed device is positioned within a drying chamber of said thermal drier.

18. The apparatus of claim 16, further comprising a pressure boosting device for receiving said dewatered mixture from said mechanical dewatering device at a first pressure and feeding said dewatered mixture at an increased pressure to said feed device, whereby said feed device feeds said sludge into said drier at a substantially uniform rate.

19. The apparatus of claim 16, wherein said thermal drier includes a hot drying gas inlet and an exhaust gas outlet, said apparatus including a conduit extending from said exhaust gas outlet to said drying gas inlet for recycling said exhaust gas.

20. The apparatus of claim 19, further comprising a particle separator positioned in said conduit for separating fine particulates from said exhaust gas and for feeding said fine particulates to said mechanical dewatering device for mixing with said solid-liquid mixture.

21. The apparatus of claim 16, wherein said mechanical dewatering device is a centrifugal separator.

22. The apparatus of claim 16, wherein said mechanical dewatering device is a belt press.

23. The apparatus of claim 16, wherein said mechanical dewatering device is a plate and frame pressure filter.

24. The apparatus of claim 16, wherein said thermal drier is a drum drier.

25. The apparatus of claim 16, wherein said thermal drier is a fluidized bed drier.

26. A process for drying sludge comprising the steps of feeding wet sludge to a mechanical dewatering device and dewatering said sludge to form a dewatered sludge, immediately thereafter, feeding said dewatered sludge to a feed device for granulating and producing a granulated dewatered sludge and discharging said granulated dewatered sludge directly into a drier, wherein said feed device is positioned within said drier and said process comprises discharging said granulated dewatered sludge from said feed device into said drier, and immediately thereafter, heating said granulated dewatered sludge in said drier to produce dried sludge granules.

27. A process, for drying sludge comprising the steps of feeding wet sludge to a mechanical dewatering device and dewatering said sludge to form a dewatered sludge, immediately thereafter, feeding said dewatered sludge to a feed device for granulating and producing a granulated dewatered sludge and discharging said granulated dewatered sludge directly into a drier, wherein said feed device is mounted directly on said drier and said feed device has an outlet within said drier whereby said feed device discharges said granulated dewatered sludge directly into said drier, and immediately thereafter, heating said granulated dewatered sludge in said drier to produce dried sludge granules.

* * * * *